Sept. 21, 1948. F. L. McGARY ET AL 2,449,561
SHEAR
Filed Oct. 3, 1944 2 Sheets-Sheet 1
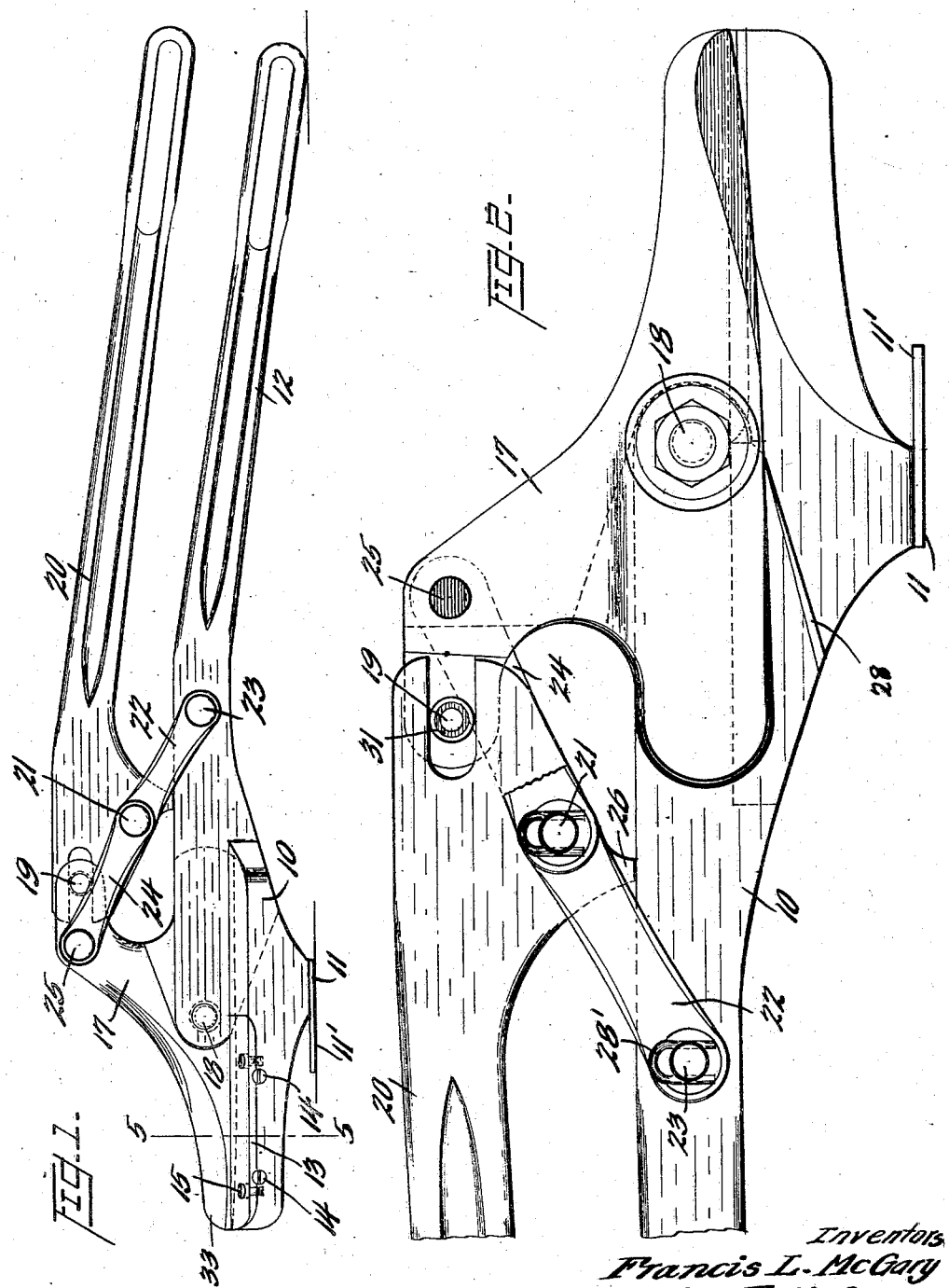
Inventors
Francis L. McGary
Charles E. McGary,
By Frank W. Dahm.
Att'y Sept. 21, 1948. F. L. McGARY ET AL 2,449,561
SHEAR
Filed Oct. 3, 1944 2 Sheets-Sheet 2
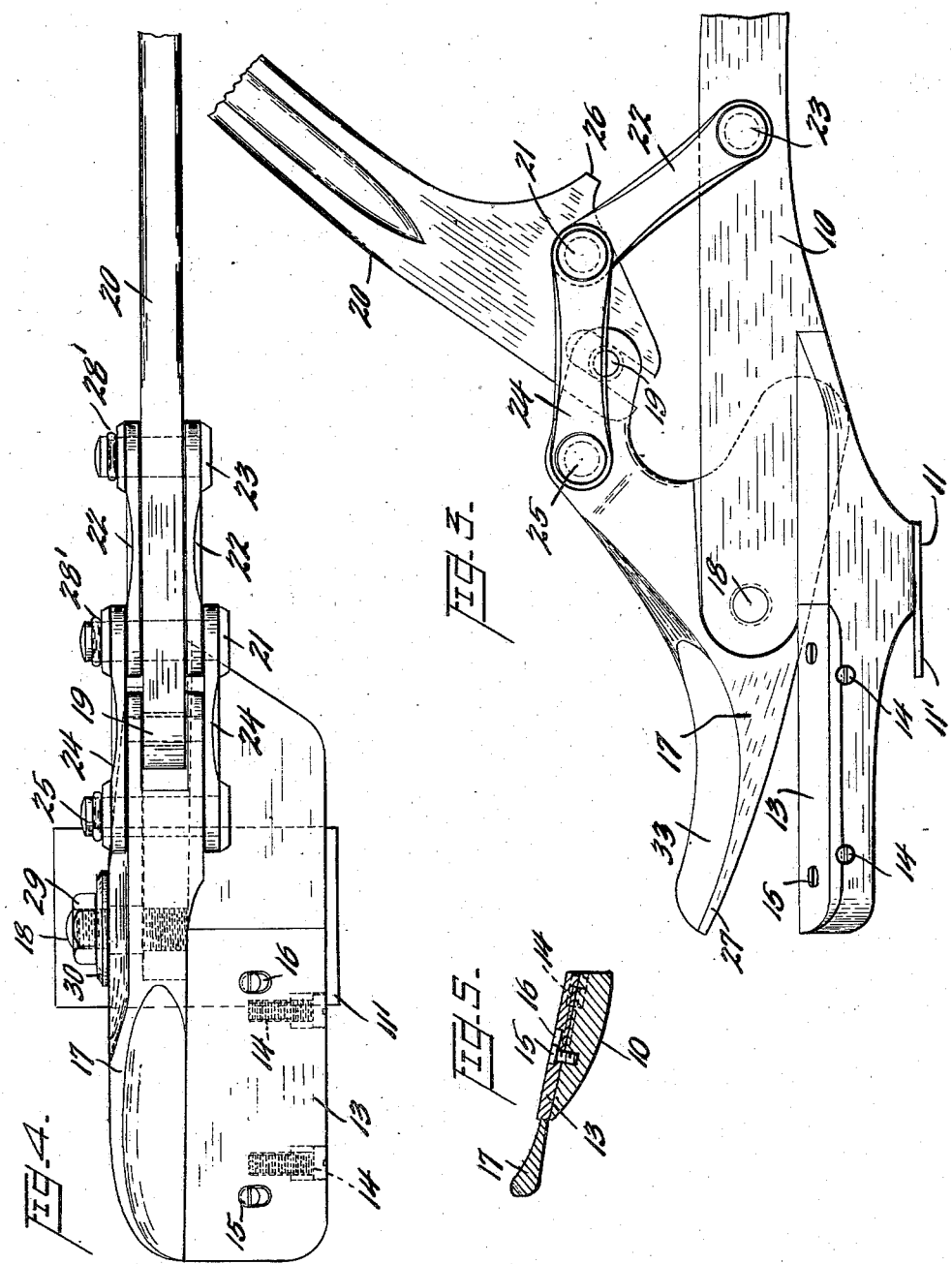
Inventors
Francis L. McGary
Charles E. McGary,
By Frank W. Dahn
Atty Patented Sept. 21, 1948

2,449,561

UNITED STATES PATENT OFFICE 2,449,561

SHEAR

Francis L. McGary and Charles E. McGary, Hardinsburg, Ky.

Application October 3, 1944, Serial No. 556,968

6 Claims. (Cl. 30—251)

Our invention relates to a shear for sheet metal and the like, and it is an object of the same to provide a shear that shall have a simple, direct and powerful action.

Another object is to provide improved connections between a movable operating handle and the movable shear blade in a shear of the bench type, though capable of use in other shears.

Referring now to the drawings, which are annexed hereto and made a part of this application, and in which similar reference characters indicate similar parts:

Fig. 1 is a side elevation of one form of the invention,

Fig. 2, an elevation as viewed from the opposite side, with parts omitted and being on a larger scale, Fig. 3, a view similar to Fig. 1, but with parts omitted and being on a larger scale, showing the shear open, Fig. 4, a top plan of the shear, Fig. 5, a section on line 5—5 of Fig. 1.

In the drawings, reference character 10 indicates the base of the first form of the shear, having a flat under face at 11, adapted to rest on a bench or other support having a flat upper face. Preferably the base is formed with a forwardly projecting lip 11' that is adapted to be slipped under a suitable holding means on the bench, e. g., a U-shaped loop of metal in the form of a hoop fastened to the top of the bench and shaped to receive the lip and to hold it so as to prevent tilting movement of the shear with relation to the bench when the shear is operated. Obviously other holding means may be used to engage with the lip, and preferably they will be such as to permit ready separation of the shear from its support. A handle 12 fixed to or integral with the base has its outer end shaped to rest on the table or bench or other support for the shear when the same is positioned for use.

A cutting blade 13 of specially hardened steel or the like is fixed to the base 10 by means comprising screws 14, 14 and 15, 15. The screws 14, 14 are threaded to the base and serve to adjust the blade toward and from another blade hereinafter described, so as to compensate for wear and the like, while the screws 15, 15 are mounted in the base and pass through elongated slots 16 in the blade, these slots being shown as countersunk and as receiving the heads of the screws 14, 14, which are thus enabled to clamp the blade in place while yet being out of the way of the work by being below the upper face of the blade.

A blade 17 is pivoted to the base 10 by a pivot 18, the latter blade carrying a pin 19 that is slidably engaged in a slot 20 at the forward end of the upper handle 20 of the shear. The handle 20 is mounted on a pivot pin 21 of a toggle member comprising a pair of links 22, 22 at opposite sides of the shear, said links being pivoted at one end to the base 10 at 23 and being connected at their other ends to the pivot 21. The other member of the toggle consists of a pair of links 24, 24, located at opposite sides of the shear and mounted at one end on a pivot 25 on the shear blade 17, while supported at the other end by the pivot 21. A stop 26 on the handle 20 is located so as to strike the base and limit closing movement of the shear.

The base 10 underneath the hardened blade 13 is rounded laterally so as to be relatively thin adjacent the cutting edge, whereas shear member 17 is tapered forwardly from its rear end and laterally toward its cutting edge, as shown in Figs. 1 and 5 and at 27 in Fig. 3, so that in cutting sheet metal for instance the shear may be turned readily to the right or left about an axis perpendicular to the work. Thus various shapes may easily be made, the shear turning with equal facility to either right or left, whereas with ordinary shears it is almost impossible to veer to the right, particularly to any considerable extent, and is even difficult to turn to the left. Usually we prefer to construct the blade 17 so that its cutting edge lies in a gentle uniform curve, as shown in Fig. 3, though the blade 13 will usually have a straight cutting edge.

By shaping the blades so that they are narrow in a vertical sense adjacent their cutting edges, by inclining their under faces generally upward toward the righthand side of the shear (looking forward), and preferably inclining their upper faces in a like manner, the thin portions adjacent their cutting edges will turn the newly cut edges of the sheet metal or other work laterally aside over the low adjacent face of the adjacent shear blade, and so make it easy to change from a straight line cut to any desired angle or curve.

A rearwardly and downwardly inclined laterally curved slope at 28 (Fig. 2) aids in guiding the sheet metal downwardly and away from the shear. The blade 17 has a sort of duckbill appearance when viewed from the left, on account of the curved upper lines at opposite sides of the same and by reason of the laterally and forwardly down-sloping face at 33 (Figs. 1 and 3), all of which aids in facilitating turning of the shear and guiding the edges of the cut material away from the shear.

The shear is characterized by few and simple parts, and further by ready demountability of parts. Thus the several pivots 21, 23 and 25 consist of readily removable pins that are held by U-shaped spring clips or cotters 28' engaging in annular grooves in the pins or in slots at opposite sides of said pins. The pivot 18 is formed by a stud screwed into the base and having a nut 29 and a washer 30 for holding the movable jaw in place on it. The blade 13 can be removed or replaced for sharpening, etc., by merely backing off the adjusting screws 14 and taking out the holding screws 15.

In operation, the shear being open as in Fig. 2, the handle 20 is forced downward, thereby simultaneously forcing the joint of the toggle at 21 downward and straightening the toggle, and also causing the pivot 19 to ride to the right in the slot of handle 20, whereby it approaches the joint of the toggle and so increases the power of the lever to rock the blade toward closed position as the said blade approaches that position. The pivot of the blade 17 and handle 20 is provided with an anti-friction sleeve 31 to reduce wear and to provide a readily replaceable part at this point of heavy wear.

While the shear so far described is shown as being of the bench type the principles of the same may be embodied in whole or in part in shears of other varieties, e. g. in a small hand-held and hand-operated shear to be used for cutting sheet metal or other like materials.

The novel linkage used in the shear of Figs. 1 to 5 is one that can be utilized in many other hand-operated tools and devices, whether operated by moving one handle or more and which can also be used in other relations for transmitting force or motion, as will be obvious. It will be obvious also to those skilled in the art that many changes may be made in the devices of our invention, all without departing from the spirit of the invention; and therefore we do not limit ourselves to what is shown in the drawings and described in the specification, but only as indicated in the appended claims.

Having thus fully described our invention, what we claim is:

1. In a shear, a handle, a blade rigid with the handle, a blade pivotally connected to said handle and having a rearward extension, a toggle having pivotally connected links one of which is pivoted to said handle, the other one of said links being pivoted to a rearward extension of said second-named blade, and a handle pivotally mounted on the pivot between the links of the toggle, the last-named handle having a pin-and-slot connection with said rearward extension of the second-named blade.

2. In a shear, a handle, a blade fixed thereon, another blade pivotally connected to said handle, a toggle connection between said handle and the upper portion of said blade, and a handle carried by said toggle and having pin and slot connection with the second-named shear blade.

3. A shear having a handle, a blade fixed thereto, a coacting blade pivoted to the first-named blade, a toggle connecting the first blade to a point above the pivot of the second blade, a handle carried on the toggle, and a pin and slot connection between the last-named handle and the second blade.

4. A manually operated tool comprising a handle, a jaw fixed thereto, a second jaw pivoted to the first, a toggle connecting said handle and said second jaw, said toggle being located rearwardly of the pivot between said jaws, and a handle carried by said toggle and having pin and slot connection with said second jaw.

5. A mechanical movement comprising a pair of pivotally connected members, a toggle connecting said members rearwardly of their pivotal connection, and a lever pivoted on said toggle and having pin and slot connection with one of said members rearwardly of said pivotal connection.

6. Power transmitting means comprising a lever, a second lever pivoted to the first, a toggle connecting said levers at one side of their pivot, and a third lever carried by the toggle and having a pin and slot connection to the second lever rearwardly of its connections to said toggle.

FRANCIS L. McGARY.
CHARLES E. McGARY.

REFERENCES CITED

The following references are of record in the file of this patent:

UNITED STATES PATENTS

| Number | Name | Date |
| --- | --- | --- |
| 1,092 | Heinisch | Feb. 27, 1839 |
| 127,708 | Rhamy | June 11, 1872 |
| 160,563 | Billings | Mar. 9, 1875 |
| 579,085 | Wesselmann | Mar. 5, 1897 |
| 2,264,840 | Isaac | Dec. 2, 1941 |